United States Patent [19]
Whitfield

[11] 4,316,508
[45] Feb. 23, 1982

[54] AUTOMATIC RIPPER RESET MECHANISM

[75] Inventor: Carroll J. Whitfield, Tifton, Ga.

[73] Assignee: Beatrice Foods Co., Chicago, Ill.

[21] Appl. No.: 119,922

[22] Filed: Feb. 8, 1980

[51] Int. Cl.³ .............................................. A01B 13/08
[52] U.S. Cl. ..................................... 172/271; 172/699
[58] Field of Search ................................ 172/261–271, 172/705–711, 699

[56] References Cited

U.S. PATENT DOCUMENTS

| 444,986 | 1/1891 | Bloominger | 172/265 |
| 642,510 | 1/1900 | Tuttle | 172/268 |
| 2,395,342 | 2/1946 | Morkoski | 172/271 |
| 2,673,510 | 3/1954 | Bailey | 172/271 |
| 3,960,220 | 6/1976 | Laitala | 172/699 |
| 4,058,169 | 11/1977 | Jacobsson | 172/269 |
| 4,116,280 | 9/1978 | Rehn | 172/266 |
| 4,214,635 | 7/1980 | Lely | 172/271 |

FOREIGN PATENT DOCUMENTS

| 635406 | 1/1962 | Canada | 172/264 |
| 1087393 | 8/1960 | Fed. Rep. of Germany | 172/271 |
| 24498 | 12/1962 | Fed. Rep. of Germany | 172/271 |

OTHER PUBLICATIONS

Rome Ind. Form No. PL 951, "Swivel Subsoiler", 4/3/1970, Published by Rome Ind., Cedartown, Ga.

Primary Examiner—Richard J. Johnson
Attorney, Agent, or Firm—Robert M. Ward

[57] ABSTRACT

The improved automatic ripper reset mechanism of the present invention includes a punch fixedly disposed on the distal free end of a ripper blade head for downward arcuate motion in response to the ripper blade striking an obstruction, a die having a matching contour surface, an incrementally fed shear bar disposed opposite the punch for fixed engagement between the punch and the die when the reset apparatus is in ripping functional position, and to be sheared off when the reset mechanism is sprung, a reset mechanism frame supporting a spring loaded push block means for incrementally advancing the shear bar, brake means for preventing expulsion of the shear bar from the frame by the push block means when the reset mechanism is in sprung position, and torque storage means for receiving torque during the springing of the reset mechanism by means of striking an obstruction and for retransmitting the stored torque to reset the mechanism.

11 Claims, 10 Drawing Figures

AUTOMATIC RIPPER RESET MECHANISM

BACKGROUND OF THE INVENTION

The present invention generally concerns an agricultural sub-soiling ripper apparatus and is more particularly directed to an improved automatic ripper reset mechanism.

In prior art sub-soiling ripper devices, the ripper head is pivotably attached at a portion thereof to a frame and the front portion of the ripper head is typically secured by means of a shear pin to the frame. When the downwardly extending and sub-soiling ripper blade strikes an obstruction during tilling, the shear pin breaks and the sub-soiling ripper blade swings backwardly to prevent damage to the frame. In such devices, it has been necessary for the farmer then to raise the level of the ripper apparatus frame and to manually swing the ripper blade forward for insertion of a new shear pin to secure the ripper blade in ripping functional position. This type of apparatus has necessitated a relatively great amount of manual labor on the part of the farmer, with a resultant decrease in agricultural efficiency and in profit.

The attempts that have been made to resolve this problem have generally been less than optimal in the stability of their engineering design and construction whereby the problem of inefficiency is further aggravated.

Accordingly, it is a primary object of the improved automatic ripper reset mechanism of the present invention to overcome these and other deficiencies of the prior art by providing the present invention as disclosed and claimed hereinbelow.

SUMMARY OF THE INVENTION

The improved automatic ripper reset mechanism of the present invention includes a punch fixedly disposed on the distal free end of a ripper blade head for downward arcuate motion in response to the ripper blade striking an obstruction.

The improved automatic ripper reset mechanism further has a die with a matching contour surface wherein an incrementally fed shear bar is disposed opposite the punch for fixed engagement between the punch and the die when the reset apparatus is in ripping functional configuration.

A reset mechanism frame, supports a spring loaded shear bar, which is sheared off when the reset mechanism is sprung, thereby releasing brake means for preventing expulsion of the shear bar from the frame.

Torque storage means is provided for receiving torque during the springing of the reset mechanism by means of striking an obstruction and for retransmitting the stored torque to reset the mechanism.

The improved automatic ripper reset mechanism of the present invention, and preferred and alternative embodiments thereof, may be more completely understood with reference to the following drawing and the detailed description of exemplary embodiments.

BRIEF DESCRIPTION OF THE DRAWING

An exemplary embodiment of the improved automatic ripper reset mechanism of the present invention is illustrated in the following drawing, in which.

DETAILED DESCRIPTION OF PREFERRED EMBODIMENTS

The present invention concerns a sub-soiling ripper apparatus of the kind having a ripper blade bearing a distally disposed and forwardly extending soil engaging ripper shank, and a proximally disposed and forwardly extending ripper head. The ripper head in such illustrative sub-soil rippers is mounted for downward pivotal motion of the ripper head and rearward pivotal motion of the attached ripper shank about a ripper pivot shaft disposed near the proximal end of the ripper shank, which motion occurs when the ripper blade strikes a substantial sub-soil obstruction. This is the sprung position of the apparatus. The automatic ripper reset apparatus of the present invention includes means for return forward pivotal motion when the ripper is reset from such a sprung position to the ripping functional position.

The automatic ripper reset mechanism of the present invention includes a reset mechanism frame, which is supported by the implement frame. The improved automatic ripper reset mechanism of the present invention includes a punch fixedly disposed near the distal, free end of the ripper head for downward arcuate motion in response to the rearward pivotal motion of the ripper shank upon the ripper blade striking an obstruction in the soil. The automatic ripper reset mechanism of the present invention includes a die disposed adjacent the punch and cooperating therewith, which die has a surface contour corresponding to that of the punch for mating cooperation therebetween.

An incrementally fed shear bar is disposed opposite the punch and is supported and moved in a shear bar track within the reset mechanism frame. The shear bar has a distal end which is disposed between the punch and the die to secure the ripper in ripping functional configuration. A spring loaded push block is provided for incrementally advancing the shear bar and is disposed on the reset mechanism frame for urging engagement with the proximal end of the shear bar to advance the shear bar radially of and intersecting the path of arcuate motion of the punch. This urging disposes the shear bar between the punch and the die to secure the mechanism in ripping functional position.

Brake means are provided for overcoming the radial advance of the shear bar when the ripper blade is disposed in the sprung position, such as is caused by the ripper blade striking an obstruction. Also included as an aspect of the present invention are torque storage means connected to a ripper pivot shaft for receiving torque from the turning of the shaft in response to pivoting of the ripper blade caused by the striking of the sub-soil obstruction, and for transmitting the stored torque to the ripper shaft when the obstruction has passed from the front of the ripper blade. The result is to return and reset the ripper blade from the sprung position to the ripping functional position.

In preferred alternative embodiments of the automatic ripper reset mechanism of the present invention, the shear bar engaging surface of the die is substantially circular in transverse cross-section and the mating surface of the punch is also substantially circular and congruent with the corresponding engaging surface of the die to shear an arcuate shaped portion from the shear bar during rearward pivoting of the ripper blade as caused by the striking of a sub-soil obstruction.

In further preferred embodiments of the automatic ripper reset mechanism of the present invention, the distal end of the ripper blade head includes means for engaging the brake means during reset to the ripping position to release the brake means for permitting forward motion of the shear bar for disposition between the mating die and punch.

In preferred embodiments of the automatic ripper reset mechanism of the present invention, the brake means includes an eccentrically mounted brake disc having a friction radial edge thereof for engagement with the shear bar. The brake means further includes biasing means disposed opposite the eccentric journal of the friction brake disc for pivoting the brake disc downwardly about its eccentric journal into frictional contact with the shear bar to halt movement of the shear bar in response to and overcome the force of the spring loaded push block means.

Also in preferred embodiments of the present invention, the biasing means include a brake actuator lever pivotably mounted at the proximal end thereof to the reset mechanism frame. The brake actuator lever further has a distal end which is engagable with the ripper blade head when the reset mechanism is in ripping functional position and which is releasable in arcuate movement toward the brake disc in response to the shear of the shear bar. The biasing means further includes spring means attached to the brake actuator lever for pivoting the lever about the proximal end thereof, and for urging the distal end thereof towards the brake disc in response to release from engagement with the ripper head. The biasing means further includes lever connector means connected at the proximal end thereof to the actuator lever, and at the distal end thereof to the brake disc opposite the eccentric journal thereof for rotating the brake disc downwardly. The result is to engage the friction radial edge of the brake disc with the upper surface of the shear bar when the ripper mechanism is in the sprung position to prevent ejection of the shear bar from the shear bar track. In these embodiments, the preferred spring means comprises a coil spring attached between the reset mechanism frame and the brake actuator lever.

In such embodiments, the lever connector means comprises a channel-shaped bar preferably for receiving a portion of the brake disc within the channel thereof. In such preferred embodiments, the connection between the channel-shaped bar and the brake disc is a pin which extends through the channel and through the portion of the brake disc contained therein.

Preferred brake actuator means include a channel-shaped bar with the channel thereof disposed in facing relationship to the lever connector means to receive the proximal end thereof for pivotable connection.

Also included in preferred embodiments of the automatic ripper reset mechanism of the present invention are stop means for restricting the extent of arcuate movement of the pivotal end of the brake actuator lever when the reset mechanism is in the sprung position, to be engagable with the ripper head when the mechanism is reset. In these preferred embodiments, the stop means preferably includes a bar fixedly disposed transverse of the path of travel of the shear bar and above the plane thereof, but below the level of the brake actuator lever.

In further preferred embodiments of the automatic ripper reset mechanism of the present invention, the reset mechanism frame is channel-shaped to define at the channel floor a shear bar track for longitudinal movement of the shear bar thereon and channel side walls for enclosing the reset mechanism.

Preferred embodiments of the brake disc have a disc which is eccentrically mounted on a disc shaft and extends transversely on the path of incremental feed of the shear bar and thereabove. In such embodiments, the spring loaded push bar means include at least one coil spring attached at one end to the reset mechanism frame and extend longitudinally of the path of incremental feed of the shear bar and around the disc shaft, and further are attached at the other end to the push block for urging the push block along the longitudinal path of the shear bar track to feed the shear bar for reset. In such embodiments, the coil springs are disposed around respective sides of the disc shaft laterally of the brake disc for balanced tension at each transverse side of the push block and to minimize twisting and binding of the push block during feeding of the shear bar.

The push block, as used in preferred embodiments of the automatic ripper reset mechanism of the present invention, has a longitudinal slit in the top surface thereof which extends to the shear bar engaging front edge of the push block. The push block slit is of sufficient dimensions to receive the brake disc therein when the shear bar has been substantially exhausted by repeated shearing and reset, to prevent engagement at those occasions between the brake disc and the push block when the reset mechanism is in the sprung position. The result of this aspect of the present invention is that the remaining stub of the substantially exhausted shear bar may be automatically ejected from the reset mechanism when sufficiently short, but is maintained within the reset mechanism when further shearing may be accomplished on a non-exhausted shear bar.

The torque storage means preferably includes at least one spring loaded reset piston connected at its proximal end to the reset mechanism frame. In preferred embodiments, a torque lever is secured to the ripper reset shaft and has the reset piston pivotably attached thereto. In such embodiments, the reset piston preferably includes an externally disposed piston sleeve receiving an internally disposed piston plunger. Both the plunger and the sleeve include coil spring confining stops affixed thereto. A coil spring is disposed about the reset piston between the respective plunger and sleeve coil spring confining stops. Thus, when the reset mechanism is in the sprung position, the torque lever turns with the ripper reset shaft to urge the piston plunger into the piston sleeve, thereby compressing the confined coil spring to store torque for retrorotation of the ripper rest shaft in order to reset the mechanism.

Figure 1:
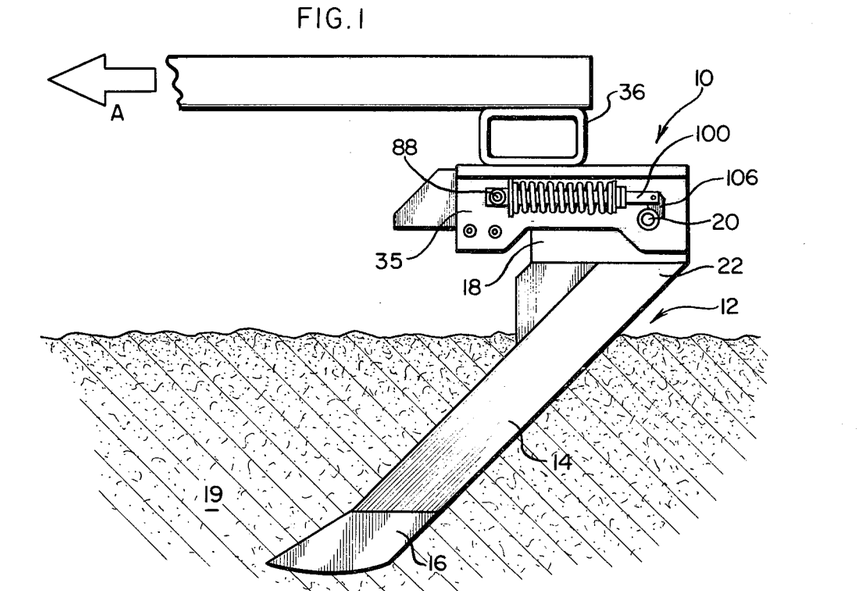
FIG. 1 is a longitudinal side view in partial cross-section of the improved automatic ripper reset mechanism of the present invention, which is supported by an implement frame and showing the more general aspects of the mechanism in ripping functional position engaging and sub-soiling the soil at an operational depth.
Figure 2:
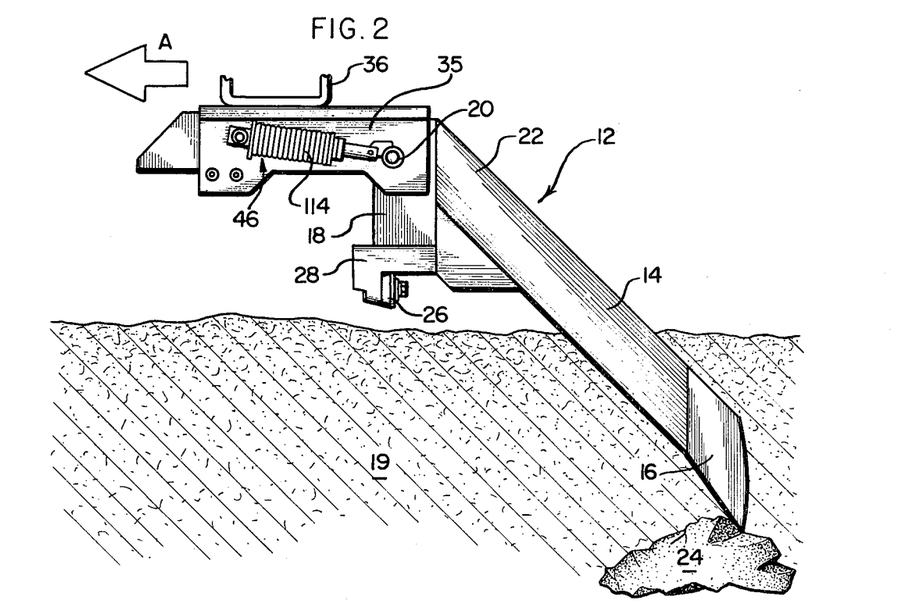
FIG. 2 is a longitudinal side view with the implement frame more fully cut away, and also showing the more general aspects of the improved automatic ripper reset mechanism of the present invention in sprung position as caused by the striking of the ripper blade by a sub-soil obstruction in the earth.

Referring now to the drawing and to FIG. 1 in particular, the automatic ripper reset mechanism generally 10 of the present invention is for use in connection with a sub-soiling ripper apparatus of the kind having a ripper blade generally 12 bearing a distally disposed and forwardly extending soil engaging ripper shank 14 terminating in a shovel 16 for engaging the soil 19 at sub-soil depth. Ripper blade 12 further includes a proximally disposed and forwardly extending ripper head 18. Ripper head 18 in such illustrative sub-soil rippers is mounted for downward pivotal motion of ripper head 18 and rearward pivotal motion of the attached ripper shank 14 about a ripper pivot shaft 20 disposed on ripper head 18 near its articulation with the proximal end 22 of ripper shank 14, such as when the ripper blade strikes a substantial sub-soil obstruction 24 such as a rock or log. This is shown in FIG. 2. The functioning of the automatic ripper reset mechanism 10 of the present invention is for return forward pivotal motion when the ripper is reset from the sprung position of FIG. 2 to return to the ripping functional position of FIG. 1.

Figure 3:
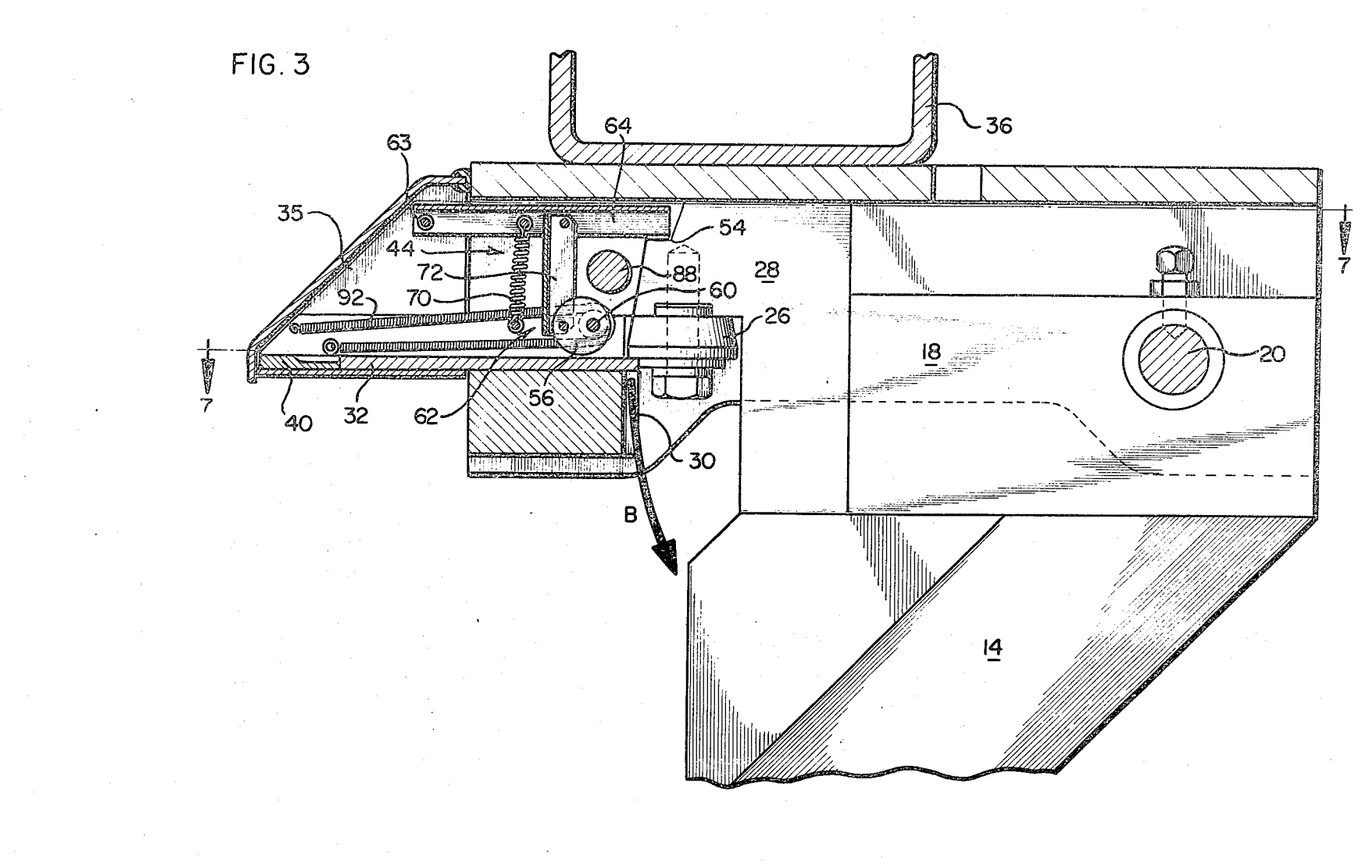
FIG. 3 is a more detailed, enlarged longitudinal side view of the embodiment of FIG. 1 in partial cross-section through the reset mechanism frame, and disposed in ripping functional position, illustrating (at Arrow B) the downward arcuate motion of the punch in cooperation with the die cutting through the incrementally fed shear bar.
Figures 4, 6:
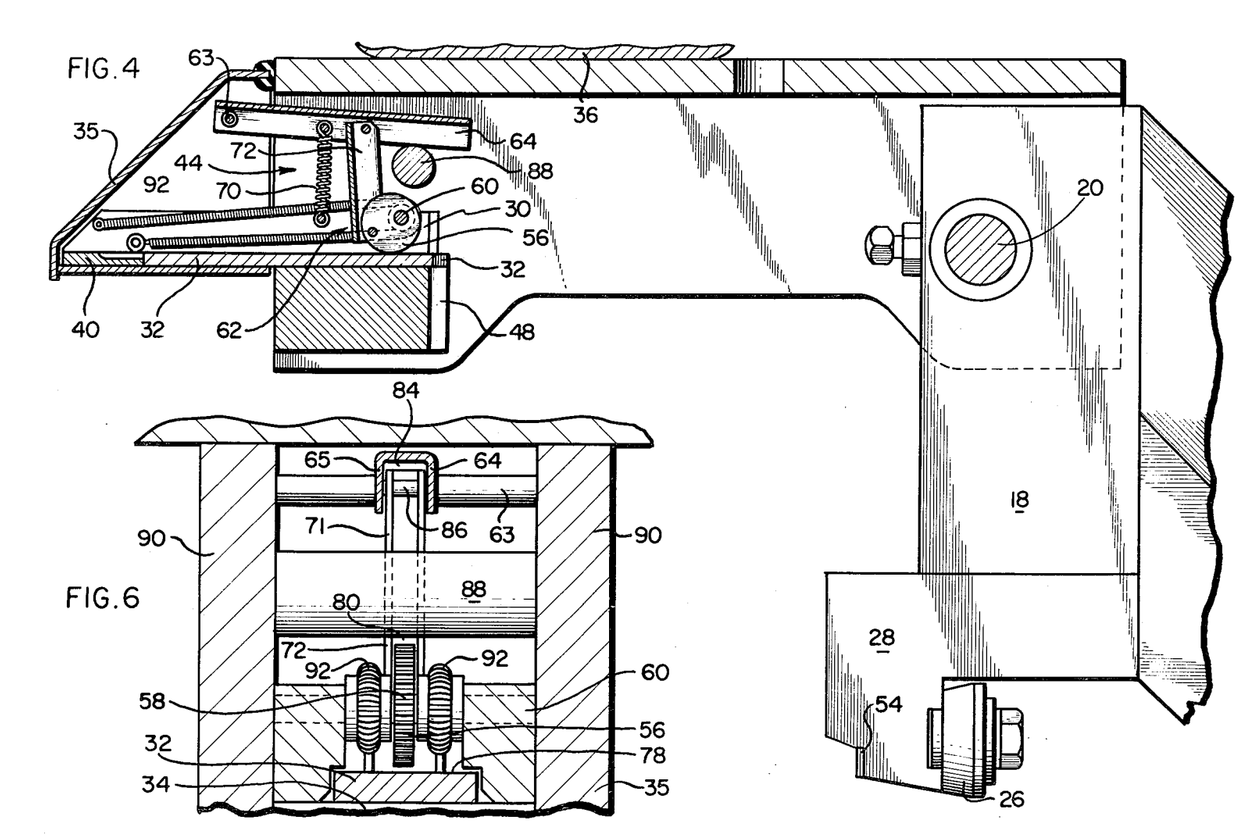
FIG. 4 is also a detailed side view of the embodiment of the improved automatic ripper reset mechanism as shown in FIG. 3 in partial longitudinal cross-section and with a portion of the reset mechanism frame cut away to show the functional elements thereof disposed in sprung position and illustrating the engagement of the brake means for holding the incrementally fed shear bar from being expelled from the reset mechanism.
FIG. 6 is a transverse cross-sectional view taken along line 6—6 of FIG. 5, and illustrates in particular the functional elements of the brake means, including an eccentrically mounted brake disc having a friction radial edge surface, a biasing means in the form of a brake actuator lever and a lever connector means for operative and disc lowering engagement with the disc, and further showing on opposite sides of the eccentrically mounted brake disc springs for driving the spring loaded push block.
Figure 5:
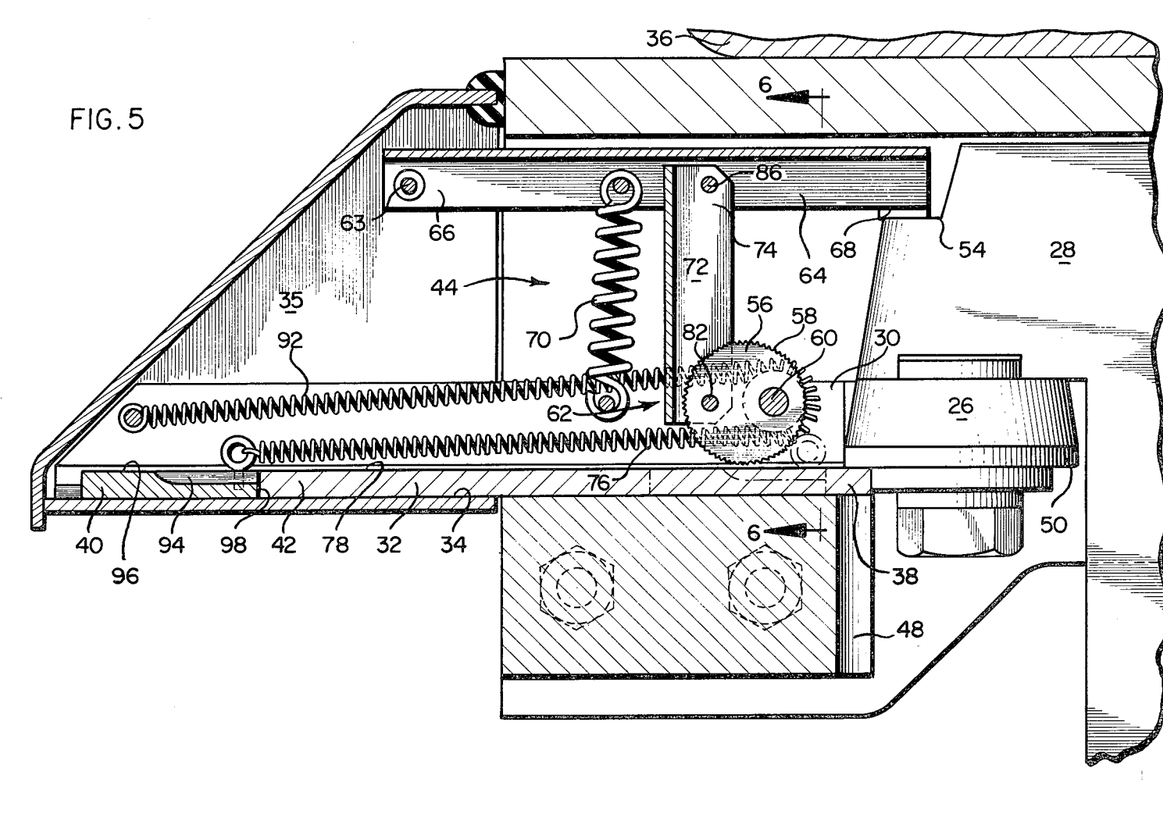
FIG. 5 is a greatly enlarged longitudinal side view with a portion of the reset mechanism frame cut away to illustrate in yet greater detail the functional elements thereof, and in particular illustrating the shearing engagement between the punch and the die with the incrementally fed shear bar in ripping functional position and showing the disengagement of the automatic brake means with the shear bar, which is incrementally fed by means of the spring loaded push block.
Figures 7, 8:
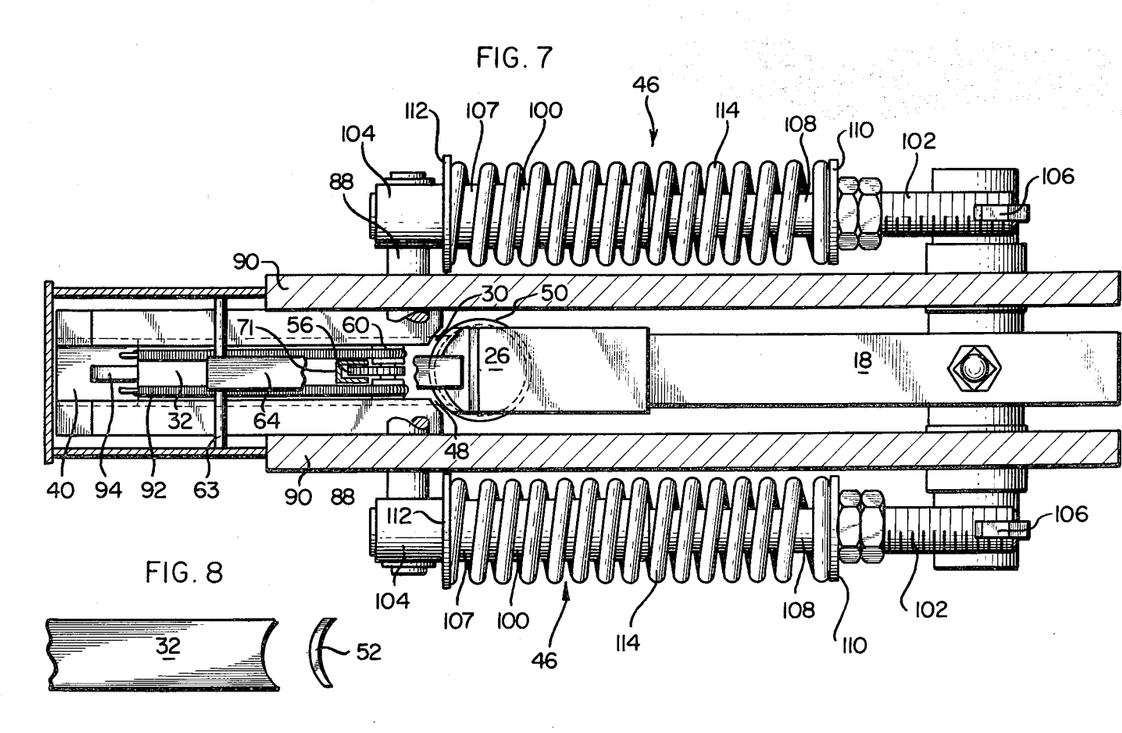
FIG. 7 is a plan view of the automatic ripper reset mechanism of the present invention taken along line 7—7 of FIG. 3, showing the shear bar advancing and braking mechanism, the die and engaging punch (in phantom lines) for securing the pivotably mounted ripper head, and the torque storage means in the form of piston mounted coil springs.
FIG. 8 is a plan view of the incrementally fed shear bar showing and illustrating the configuration of a sheared off portion thereof as occurs when the mechanism has been sprung.

With particular reference to FIGS. 3, 4 and 5, automatic ripper reset mechanism 10 includes a punch 26 fixedly disposed near the distal, free end 28 of ripper head 18 for downward arcuate motion as shown at Arrow B of FIG. 3 in response to the rearward pivotal motion as shown in FIG. 2 of ripper shank 14 upon ripper blade 12 striking obstruction 24 in soil 19. Automatic ripper reset mechanism 10 of the present invention includes a die 30 disposed adjacent punch 26 and cooperating therewith, which die 30 has a surface contour corresponding to that of punch 26 for mating cooperation therebetween. An incrementally fed shear bar 32 of the configuration shown in FIG. 8 is disposed opposite punch 26 and is supported and moved in a longitudinal shear bar track 34 as shown in FIG. 6. Shear bar track 34 is disposed within a reset mechanism frame 35 which is carried by the implement frame 36 as shown partially cut away. Shear bar 32 has a distal end 38 which is disposed between punch 26 and the die 30 to secure the ripper in ripping functional configuration as shown in FIGS. 1, 3 and 5. A spring loaded push block 40 is provided for incrementally advancing shear bar 32 and is disposed on track 34 in reset mechanism frame 35 for urging engagement with the proximal end 42 of shear bar 32 to advance shear bar 32 radially of and intersecting the path of arcuate motion (see Arrow B of FIG. 3) of punch 26. This urging disposes shear bar 32 between punch 26 and die 30 to secure the mechanism in ripping functional position as shown in FIGS. 1, 3 and 5.

Brake means generally 44 are provided for overcoming the radial advance of shear bar 32 when ripper blade 12 is disposed in the sprung position of FIGS. 2 and 4, such as is caused by ripper blade 12 striking obstruction 24. Also included as an aspect of the present invention are torque storage means generally 46 which are shown in greater detail in FIGS. 7, 9 and 10. Such torque storage means 46 are connected to ripper pivot shaft 20 for receiving torque from the turning of shaft 20 in response to pivoting of ripper blade 12 caused by the striking of sub-soil obstruction 24, and for transmitting the stored torque to ripper shank 14 when obstruction 24 is removed from the path of ripper blade 12. The result is to return and reset the ripper from the sprung position of FIGS. 2, 4 and 10 to the ripping functional position of FIGS. 1, 3, 5, 7 and 9.

In preferred alternative embodiments of automatic ripper reset mechanism 10 of the present invention, and as shown in FIGS. 5 and 7 the shear bar engaging surface 48 of the die 30 is substantially circular in transverse cross-section, and the mating surface 50 of punch 26 is also substantially circular and congruent with the corresponding engaging surface 48 of die 30 to shear an arcuate shaped portion 52 from shear bar 32 as shown best in FIGS. 7 and 8, such shearing during rearward pivoting of ripper blade 12 as caused by the striking of sub-soil obstruction 24 as shown in FIG. 2.

In further preferred embodiments of automatic ripper reset mechanism 10 of the present invention, distal end 28 of ripper head 18 includes means such as notch 54 therein for engaging brake means 44 during reset to the ripping position to release brake means 44 for permitting forward motion of shear bar 32 for disposition between mating die 30 and punch 26.

Brake means 44 preferably include a brake disc 56 having a friction radial edge 58 thereof for engagement with shear bar 32. Brake disc 56 is mounted at eccentric 60. Brake means 44 further includes biasing means generally 62 disposed opposite eccentric 60 of brake disc 56 downwardly about eccentric 60 into frictional contact with shear bar 32 to halt movement of shear bar 32 in response to spring loaded push block 40.

Biasing means 62 preferably includes a brake actuator lever 64 pivotally mounted by shaft 63 at the proximal end 66 thereof to reset mechanism frame 35. Brake actuator lever 64 further has a distal end 68 which is engagable with ripper head notch 54 when the reset mechanism is in ripping functional position and which is releasable in arcuate movement toward brake disc 56 in response to the shear of shear bar 32. Biasing means 62 further includes spring means 70 attached to brake actuator lever 64 for pivoting lever 64 about proximal end 66 thereof, and for urging distal end 68 thereof towards brake disc 56 in response to release from engagement with the ripper head notch 54. Biasing means 62 further includes lever connector means 72 connected at the proximal end 74 thereof to actuator lever 64, and at the distal end 76 thereof to brake disc 56 opposite eccentric 60 thereof for rotating brake disc 56 downwardly. The result is to engage friction radial edge 58 of the brake disc 56 with the upper surface 78 of shear bar 32 when the ripper mechanism is in the sprung position to prevent the ejection of shear bar 32 from the frame shear bar track 34. In these embodiments, the preferred spring means 70 comprises a coil spring attached between reset mechanism frame 35 and brake actuator lever 64.

In such embodiments and as shown in FIG. 6 in particular, the lever connector means 72 comprises a channel-shaped bar 71 preferably for receiving a portion of brake disc 56 within channel 80 thereof. In such preferred embodiments, the connection between channel-shaped bar 71 and brake disc 56 is a pin 82, as shown in FIG. 5 and which extends through channel 80 and through the portion of brake disc 56 contained therein. Preferred embodiments of brake actuator lever 64 include a channel-shaped bar 65 with the channel 84 thereof disposed in facing relationship to the lever connector bar 71 to receive the proximal end 74 thereof for pivotable connection at pin 86.

Also included in preferred embodiments of the automatic ripper reset mechanism 10 of the present invention are stop means 88 for restricting the extent of arcuate movement of pivotal end 68 of brake actuator lever 64 when reset mechanism 10 is in the sprung position such as is shown in FIG. 3. In these preferred embodiments the stop means 88 preferably includes a bar fixedly disposed transverse of the path of travel of shear bar 32 and above the plane thereof, but below the level of brake actuator lever 64.

In further preferred embodiments of automatic ripper reset mechanism 10 of the present invention and as shown in FIG. 6 in particular, reset mechanism frame 35 is channel-shaped to define a channel floor for track 34 for longitudinal movement of shear bar 32 thereon and channel side walls 90, 90 for enclosing the reset mechanism.

Preferred embodiments of brake disc 56 have a disc 56 which is eccentrically mounted on a disc shaft eccentric 60 and extends transversely of the path of incremental feed of shear bar 32 and thereabove as shown in FIG. 6. In such embodiments, the spring loaded push block 40 includes paired coil springs 92, 92 attached at one end to reset mechanism frame 35 and extend longitudinally of the path of incremental feed of shear bar 32 and around disc shaft eccentric 60 and further are attached at the other end to push block 40 for urging push block 40 along the longitudinal path of shear bar feed track 34, as is best shown in FIGS. 5 and 6. In such embodiments, coil springs 92, 92 are disposed around respective sides of the disc shaft eccentric 60 laterally of brake disc 56 for balanced tension on each transverse side of push block 40 and to minimize twisting and binding of push block 40 during feeding of shear bar 32.

As shown in FIG. 5, push block 40, as used in preferred embodiments of automatic ripper reset mechanism 10 of the present invention, has a longitudinal slit 94 in the top surface 96 thereof which extends to shear bar engaging front edge 98 of push block 40. Slit 94 is of sufficient dimensions to receive brake disc 56 therein when shear bar 32 has been substantially exhausted by repeated shearing and reset, thereby to prevent engagement between brake disc 56 and push block 40 when the reset mechanism is in the sprung position. The result thereof is that the remaining stub of the substantially exhausted shear bar may be automatically ejected from reset mechanism 10 when sufficiently short, but is maintained within reset mechanism 10 when further shearing may be accomplished on a non-exhausted shear bar.

Figure 9:
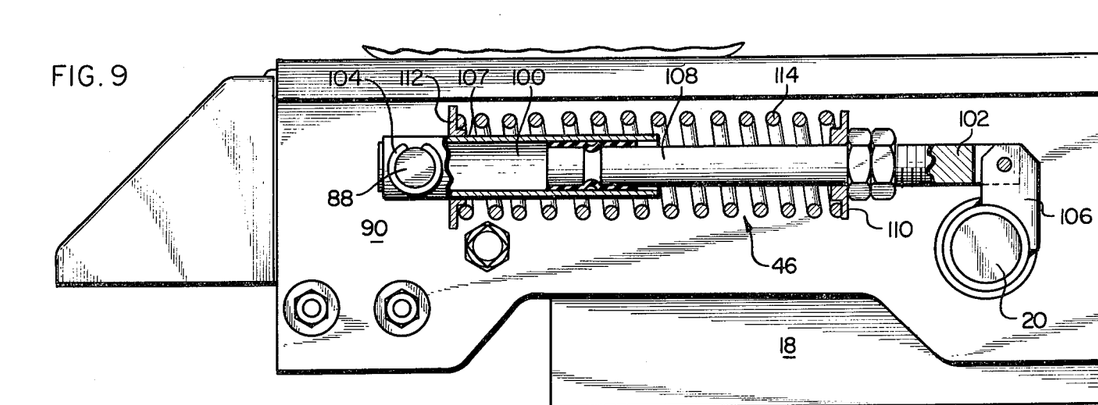
FIG. 9 is a side view of the automatic ripper reset mechanism of the present invention in ripping functional position showing the spring loaded piston of the torque storage means partially cut away.
Figure 10:
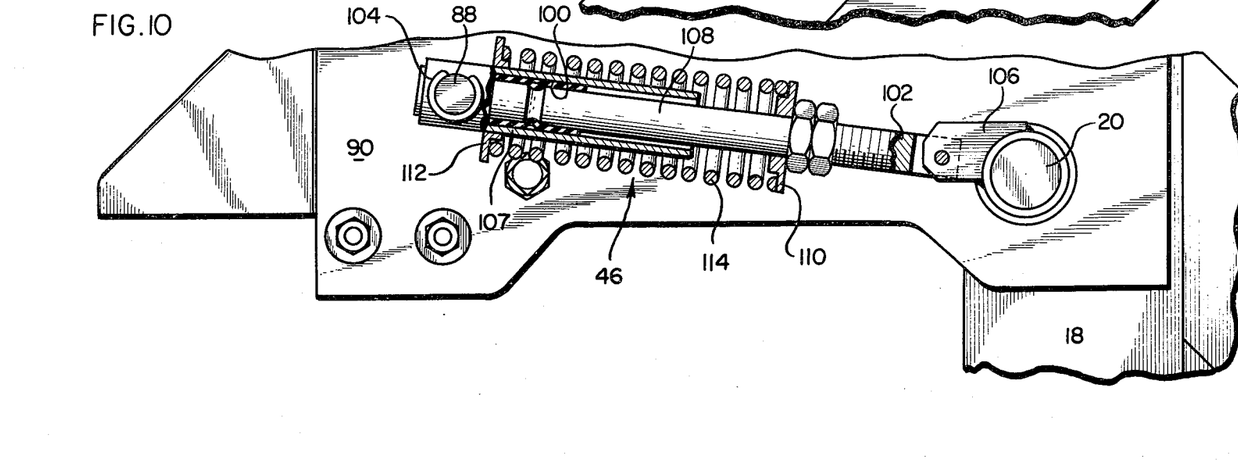
FIG. 10 is a side view of the automatic ripper reset mechanism of the present invention as shown in FIG. 9 except in sprung position, the spring loaded piston of the torque storage means in partial longitudinal cross-section and cut away to illustrate the respective disposition of the piston elements when the automatic ripper reset mechanism of the present invention is in sprung position.

The torque storage means 46 of the present invention is best shown in FIGS. 7, 9 and 10, and preferably includes a pair of spring loaded reset pistons 100, 100 connected at their proximal ends 102, 102 to ripper pivot shaft 20 and are pivotably mounted at their distal ends 104, 104 to the reset mechanism frame side walls 90, 90 on stop means 88 which extends through channel side walls 90, 90. In preferred embodiments, reset pistons 100, 100 preferably include externally disposed piston sleeves 107, 107 receiving internally disposed piston plungers 108, 108. Both plungers 108 and sleeves 107 of piston 100 include coil spring confining stops, respectively 110 and 112, affixed thereto. Coil springs 114, 114 are disposed about reset pistons 100, 100 between the coil spring confining stops 110, 112. Thus, when reset mechanism 10 is in the sprung position of FIG. 10, torque levers 106, 106 turn with ripper reset shaft 20 to urge piston plungers 108, 108 into piston sleeves 107, 107, thereby compressing the confined coil springs 114, 114 to store torque for retro-rotation of the ripper reset shaft 20 in order to reset the mechanism.

Steel is the preferred material for constructing most of the components of the automatic ripper reset mechanism 10 of the present invention, with shear bar 32 being made of a softer, shearable grade of steel, and die 30 and punch 26 being made of hardened steel. Elements such as those of the brake means 44 may be made of lighter materials. For example, push block 40 and brake disc 56 may be made of a high density polymeric material or of metal. Brake actuator lever 64 and lever connector channel-shaped bar 71 may be of a lighter gauge of metal. These materials are meant to be illustrative and not in any way exhaust the intented scope of usable materials or in any way limit the intended scope of the claims hereof.

The basic and novel characteristics of the improved automatic ripper reset mechanism of the present invention will be readily understood from the foregoing disclosure by those skilled in the art. It will become readily apparent that various changes and modifications may be made in the form, construction and arrangement of the improved automatic ripper reset mechanism of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. In a sub-soil ripper apparatus having a ripper blade bearing a distally disposed and forwardly extending soil engaging ripper shank and a proximally disposed and forwardly exnding ripper head, said ripper head mounted for downward pivotal motion of the ripper head and rearward pivotal motion of the attached ripper shank about a ripper pivot shaft disposed near the proximal end of the ripper shank when the ripper blade strikes a substantial sub-soil obstruction and for return forward pivotal motion when the ripper is reset from a sprung position to a ripping functional position, the improvement of an automatic ripper reset machanism comprising:

a punch fixedly disposed near the distal, free end of the ripper head for downward arcuate motion in response to rearward pivotal motion of the ripper shank upon the ripper blade striking an obstruction;

a die disposed adjacent said punch and having a surface contour corresponding to that of said punch for mating cooperation therebetween;

an incrementally fed shear bar disposed opposite said punch and movable in a shear bar track, said shear bar having a distal end which is disposed between said punch and said die to secure the ripper in ripping functional configuration;

a reset mechanism frame attached to and supported by the implement frame;

spring loaded push block means disposed on said reset mechanism frame for urging engagement with the proximal end of said shear bar to advance said shear bar radially of and intersecting the path of arcuate motion of said punch to dispose said shear bar between said punch and said die when in the ripping position;

brake means for overcoming the radial advance of said shear bar when the ripper blade is disposed in the rearwardly sprung position when the ripper blade has struck an obstruction, said brake means including an eccentrically mounted brake disc having a friction radial edge for engagement with said shear bar, and further having biasing means disposed opposite the eccentric journal of said brake disc for pivoting said brake disc downwardly about its eccentric journal into frictional contact with said shear bar to halt movement of said shear bar in response to said push block means; and torque storage means connected to the ripper pivot shaft for receiving torque from the turning of the shaft in response to pivoting of the ripper blade caused by the striking of a sub-soil obstruction and for retransmitting the stored torque to the ripper shaft when the obstruction is removed from the path of the ripper blade, thereby to return and reset the ripper from the spring position to the ripping position.

2. The improvement of claim 1 wherein said biasing means comprises:

a brake actuator lever pivotably mounted at the proximal end thereof to said reset mechanism frame and having a distal end engagable with said ripper blade head when the reset mechanism is in ripping functional position and releasable in arcuate movement toward said brake disc in response to the shear of said shear bar;

spring means attached to said brake actuator lever for pivotably urging said lever about the proximal end thereof and for urging the distal end thereof toward said brake disc in response to release from engagement with said ripper head; and lever connector means connected at the proximal end thereof to said actuator lever near the distal end thereof and at the distal end thereof to said brake disc opposite the eccentric journal thereof for rotating said brake disc downwardly to engage the friction radial edge thereof with said shear bar when the ripper mechanism is in sprung position to prevent the ejection of said shear bar from said frame track.

3. The improvement of claim 2 wherein said spring means comprises a coil spring attached between said reset mechanism frame and to said brake actuator lever.

4. The improvement of claim 2 wherein said lever connector means comprises a channel shaped bar for receiving a portion of said brake disc within the channel thereof and wherein the connection therebetween comprises pin means extending through the channel and the portion of said brake disc contained therein.

5. The improvement of claim 2 wherein said brake actuator means comprises a channel shaped bar with the channel thereof disposed in facing relationship to said lever connector means to receive for pivotable connection the proximal end thereof.

6. The improvement of claim 2 further comprising stop means for restricting the extent of arcuate movement of the distal end of said brake actuator lever when the reset mechanism is in sprung position to be engagable with said ripper head when the mechanism is reset.

7. The improvement of claim 1 wherein said brake disc is mounted on a disc shaft and which extends transversely to the path of incremental feed of the shear bar and thereabove.

8. The improvement of claim 7 wherein said spring loaded push block means include at least one coil spring attached at one end to said reset mechanism frame, extending longitudinally of the path of incremental feed of said shear bar and around said disc shaft, and attached at the other end to said push block for urging said push block along the longitudinal path of shear bar feed.

9. The improvement of claim 8 wherein respective said coil springs are disposed around respective sides of said disc shaft laterally of said brake disc for balanced tension on each transverse side of said push block to minimize twisting and binding thereof during feeding of said shear bar.

10. In a sub-soil ripper apparatus having a ripper blade bearing a distally disposed and forwardly extending soil engaging ripper shank and a proximally disposed and forwardly extending ripper head, said ripper head mounted for downward pivotal motion of the ripper head and rearward pivotal motion of the attached ripper shank about a ripper pivot shaft disposed near the proximal end of the ripper shank when the ripper blade strikes a substantial sub-soil obstruction and for return forward pivotal motion when the ripper is reset from a sprung position to a ripping functional position, the improvement of an automatic ripper reset mechanism comprising:

a punch fixedly disposed near the distal, free end of the ripper head for downward arcuate motion in response to rearward pivotal motion of the ripper shank upon the ripper blade striking an obstruction;

a die disposed adjacent said punch and having a surface contour corresponding to that of said punch for mating cooperation therebetween;

an incrementally fed shear bar disposed opposite said punch and supported and movable in a shear bar track, said shear bar having a distal end which is disposed between said punch and said die to secure the ripper in ripping functional configuration;

a reset mechanism frame attached to and supported by the implement frame;

spring loaded push block means disposed on said reset mechanism frame for urging engagement with the proximal end of said shear bar to advance said shear bar radially of and intersecting the path of arcuate motion of said punch to dispose said shear bar between said punch and said die when in the ripping position, said push block including a longitudinal slit in the top surface thereof and extending to the shear bar engaging front edge thereof and being of sufficient dimensions to receive a brake disc therein when said shear bar has been substantially exhausted by repeated shearing and reset to prevent engagement between the brake disc and said push block when the reset mechanism is in sprung position whereby the remaining stub of said substantially exhausted shear bar may be automatically ejected from the reset mechanism;

brake means including brake disc for engagement with the longitudinal slit of said push block for overcoming the radial advance of said shear bar when the ripper blade is disposed in the rearwardly sprung position when the ripper blade has struck an obstruction; and torque storage means connected to the ripper pivot shaft for receiving torque from the turning of the shaft in response to pivoting of the ripper blade caused by the striking of a sub-soil obstruction and for retransmitting the stored torque to the ripper shaft when the obstruction is removed from the path of the ripper blade, thereby to return and reset the ripper from the sprung position to the ripping position.

11. In a sub-soil ripper apparatus having a ripper blade bearing a distally disposed and forwardly extending soil engaging ripper shank and a proximally disposed and forwaradly extending ripper head, said ripper head mounted for downward pivotal motion of the ripper head and rearward pivotal motion of the attached ripper shank about a ripper pivot shaft disposed near the proximal end of the ripper shank when the ripper blade strikes a substantial sub-soil obstruction and for return forward pivotal motion when the ripper is reset from a sprung position to a ripping functional position, the improvement of an automatic ripper reset mechanism comprising:

a punch fixedly disposed near the distal, free end of the ripper head for downward arcuate motion in response to rearward pivotal motion of the ripper shank upon the ripper blade striking an obstruction;

a die disposed adjacent said punch and having a surface contour corresponding to that of said punch for mating cooperation therebetween;

an incrementally fed shear bar disposed opposite said punch and supported and movable in a shear bar track, said shear bar having a distal end which is disposed between said punch and said die to secure the ripper in ripping functional configuration;

a reset mechanism frame attached to and supported by the implement frame;

spring loaded push block means disposed on said reset mechanism frame for urging engagement with the proximal end of said shear bar to advance said shear bar radially of and intersecting the path of arcuate motion of said punch to dispose said shear bar between said punch and said die when in the ripping position;

brake means for overcoming the radial advance of said shear bar when the ripper blade is disposed in the rearwardly sprung position when the ripper blade has struck an obstruction; and torque storage means connected to the ripper pivot shaft for receiving torque from the turning of the shaft in response to pivoting of the ripper blade caused by the striking of a sub-soil obstruction and for retransmitting the stored torque to the ripper shaft when the obstruction is removed from the path of the ripper blade, thereby to return and reset the ripper from the sprung position to the ripping position, said torque storage means having at least one spring loaded reset piston connected at the proximal end thereof to said ripper pivot shaft and mounted at the distal end to said reset mechanism frame, and further having a torque lever secured to said ripper reset shaft with said reset piston pivotably attached thereto, and said reset piston includes an externally disposed piston sleeve receiving an internally disposed plunger, each of said plunger and said sleeve including coil spring confining stops fixed thereto, and a coil spring disposed about said reset piston between said coil spring confining stops, whereby when the reset mechanism is in the sprung position said torque lever turns with said ripper reset shaft to urge said piston plunger into said piston sleeve thereby compressing said confined coil spring to store torque for retro-rotation of said ripper rest shaft to reset the mechanism.

* * * * *